United States Patent
Wen et al.

(10) Patent No.: US 10,984,158 B1
(45) Date of Patent: Apr. 20, 2021

(54) GENERATING DESIGN VERIFICATION TEST CASES USING A RESTRICTED RANDOMIZATION PROCESS BASED ON VARIABLE DEPENDENCIES

(71) Applicant: Fortinet, Inc., Sunnyvale, CA (US)

(72) Inventors: Shushan Wen, Pleasant Hill, CA (US); John Cortes, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/836,896

(22) Filed: Mar. 31, 2020

(51) Int. Cl.
- *G06F 30/33* (2020.01)
- *G06F 16/901* (2019.01)
- *G06F 119/02* (2020.01)

(52) U.S. Cl.
CPC .......... *G06F 30/33* (2020.01); *G06F 16/9024* (2019.01); *G06F 2119/02* (2020.01)

(58) Field of Classification Search
CPC .. G06F 30/33; G06F 16/9024; G06F 2119/02; G01R 31/31917; G01R 31/317; G01R 31/31919; G01R 31/3183; G01R 31/318307

See application file for complete search history.

(56) References Cited

U.S. PATENT DOCUMENTS

| | | | | |
|---|---|---|---|---|
| 6,049,662 A * | 4/2000 | Saha | ..................... | G01R 31/317 703/16 |
| 8,413,089 B2 * | 4/2013 | Qiang | ..................... | G06F 30/39 716/106 |
| 8,904,320 B2 * | 12/2014 | Korthikanti | ......... | G06F 30/3323 716/106 |
| 9,720,792 B2 * | 8/2017 | Goswami | .............. | G06F 11/263 |
| 10,073,938 B2 * | 9/2018 | Arunagiri | ........... | G06F 30/3323 |
| 2012/0136635 A1 * | 5/2012 | Hung | ...................... | G06F 17/11 703/2 |
| 2012/0278675 A1 * | 11/2012 | Qiang | ..................... | G06F 30/39 714/739 |
| 2013/0091382 A1 * | 4/2013 | Segall | ................. | G06F 11/3684 714/32 |
| 2016/0378646 A1 * | 12/2016 | Zare | .................... | G06F 11/3684 714/38.1 |
| 2019/0370158 A1 * | 12/2019 | Rivoir | ................. | G06F 11/3672 |

OTHER PUBLICATIONS

Naveh, Yehuda et al., "Constraint-based Stimuli Generation for Hardware Verification", IBM Haifa Research Lab, 2006, pp. 1720-1727.

Kumar, PV Paneesh, "Randomization Based Verification for Microprocessors", KTH Royal Institute of Technology, Stockholm, Sweden, 2014, pp. 1-79.

\* cited by examiner

*Primary Examiner* — Nha T Nguyen

(57) ABSTRACT

Systems and methods for generating design verification test cases using a restricted randomization process are provided. According to one embodiment, a processor of a hardware design verification system receives a set of restrictions and defines a scenario involving the values that is to be excluded from the test case. The processor also receives pre-assigned values for one or more variables. For each variable other than the one or more variables, the processor assigns a first random value to the variable that is within a valid range for the variable. The processor then identifies a conflict between a first pair of variables, and resolves the conflict by assigning a second random value to a first variable or a second variable of the first pair of variables within their respective valid ranges.

20 Claims, 6 Drawing Sheets

200

```
FUNCTION ALGO_1(U, u, V, v) {
  IF (IS_ASSIGNED(U)) {
    SOLVE_CONFLICT(U, u, V, v);
  } ELSE IF (IS_ASSIGNED(V)) {
    SOLVE_CONFLICT(V, v, U, u);
  } ELSE { // NEITHER U NOR V IS PRE-ASSIGNED
    U = RAND(U); // GENERATE RANDOM VALUE FOR U BASED ON U'S RANGE
    SOLVE_CONFLICT(U, u, V, v);
  }
  IF (!IS_ASSIGNED(V)) { // V HAS NOT BEEN ASSIGNED ANY VALUE
    V = RAND(V); // GENERATE RANDOM VALUE FOR V BASED ON V'S RANGE
  }
}

FUNCTION SOLVE_CONFLICT(U, u, V, v) {
  IF (U == u) {
    IF (IS_ASSIGNED(V)) {
      IF (V == v) {
        REPORT_ERROR(); // RULE 4 VIOLATION
        EXIT; // END THE PROGRAM
      } ELSE {
        RETURN; // OK
      }
    }
    V = RAND(V, v); // GENERATE RANDOM VALUE FOR V BASED ON V'S RANGE,
                   // BUT EXCLUDING VALUE v
  }
}
```

```
FUNCTION ALGO_2(S) {
  FOR (I=0; I<NUM_PAIRS(S); ++I) {
    {U, u, V, v} = PAIR(S, I);
    ALGO_1(U, u, V, v);
  }
}
```

```
FUNCTION ALGO_3(G) {
  TRAVERSE_EDGE(G); // FIND ALL CONFLICT PAIR(G, I)
  FOR (I=0; I<NUM_PAIRS(G); ++I) {
    {U, u, V, v} = PAIR(G, I);
    ALGO_1(U, u, V, v);
  }
}
```

FIG. 2C

```
FUNCTION SOLVE_CONFLICT_EXT(U, RANGE(U,I), V, RANGE(V,I)) {
  IF (IS_IN(U, RANGE(U,I))) {
    IF (IS_ASSIGNED(V)) {
      IF (IS_IN(V, RANGE(V,I))) {
        REPORT_ERROR(); // RULE 4 VIOLATION
        EXIT; // END THE PROGRAM
      } ELSE {
        RETURN; // OK
      }
    }
    V = RAND_EXT(V, RANGE(V,I));
    // GENERATE RANDOM VALUE FOR V BASED ON ITS VALID RANGE,
    // BUT EXCLUDING RANGE(V,I)
  }
}
```

GENERATING DESIGN VERIFICATION TEST CASES USING A RESTRICTED RANDOMIZATION PROCESS BASED ON VARIABLE DEPENDENCIES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to hardware design verification. In particular, embodiments of the present invention relate to improving hardware design verification efficiency by preventing invalid test cases from being generated.

Description of the Related Art

Design verification is a process of ensuring that a design meets its specifications. When performing design verification for a hardware design, a design verification system may generate a suite of regression tests by randomizing configurations represented by a set of variables, including any of configuration parameters, register settings, memory allocation, traffic injection, and the like. A naïve approach to the randomization involves generating individual test cases by assigning each variable of the set of variables a random value within its working range (which may also be referred to herein as the variable's valid range). Simulations can be run based on a number of such test cases, which may be generated with different seeds in an effort to cover most test scenarios. This naïve approach to randomization is inefficient as it produces test cases representing combinations of variable values that are infeasible in the context of the design under test.

SUMMARY

Systems and methods are described for generating design verification test cases using a restricted randomization process. According to one embodiment, a processor implements a method of generating a test case for regression testing of a feature of a hardware design. The processor of a hardware design verification system receives a set of restrictions such that each restriction of the set of restrictions represents a dependency between values of any two variables of various variables representing inputs of the test case and defines a scenario involving the values that is to be excluded from the test case. The processor also receives pre-assigned values for one or more variables. For each variable other than the one or more variables (for which values are pre-assigned), the processor assigns a first random value to the variable that is within a valid range for the variable. The processor then identifies a conflict between a first pair of variables of the by evaluating a first value of a first variable of the first pair of variables and a second value of a second variable of the first pair of variables based on the set of restrictions, and resolves the conflict by assigning a second random value to the first variable or the second variable within their respective valid ranges.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 2A is a pseudo code fragment illustrating a technique for resolving a conflict between a pair of a first variable and a second variable in accordance with an embodiment of the present invention.

FIG. 2B is a pseudo code fragment illustrating a technique for resolving a conflict between more than one pair of a first variable and a second variable in accordance with an embodiment of the present invention.

FIG. 2C is a pseudo code fragment illustrating a technique for resolving a conflict for a graph of variables in accordance with an embodiment of the present invention.

DETAILED DESCRIPTION

Figure 1A:
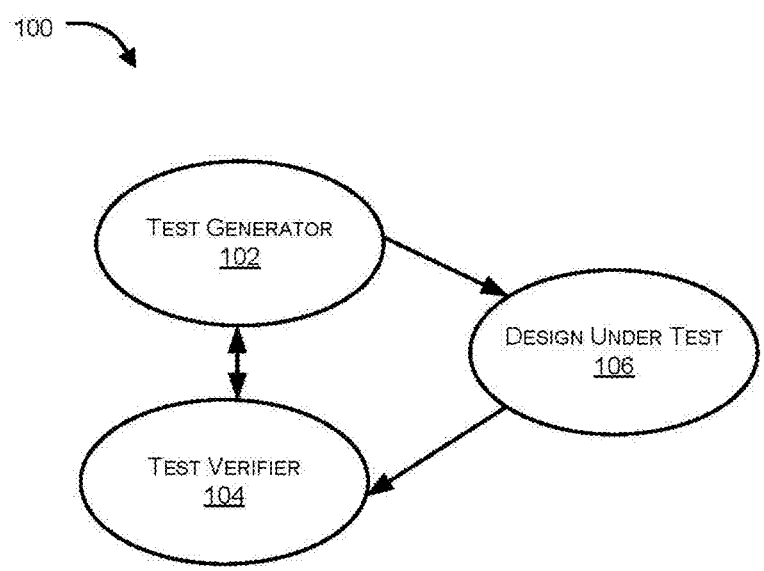
FIG. 1A illustrates a simplified architecture of a design verification process in which in aspects of the present invention can be implemented in accordance with an embodiment of the present invention.

Systems and methods are described for generating design verification test cases using a restricted randomization process. Due to design features of a hardware design under test that result in dependencies among various variables, certain combinations of values of the variables may not be feasible. Additionally, some scenarios represented by test cases created by a naïve randomization process may not be supported by the design. Therefore, existing naïve randomization approaches that blindly generate test cases without regard for variable dependencies are inefficient as they produce an over inclusive set of test cases. Since design verification is an expensive process in terms of simulation resources and engineering time, it is desirable to focus the limited engineering and simulation resources on verifying features that the design intends to support. As such, embodiments described herein seek to provide configuration information to a design verification system that can be used during generation of regression tests so as to avoid generating test cases that include values of variables that are infeasible or unsupported by the design. In one embodiment, the configuration information is provided in the form of (i) a set of restrictions each representing a dependency between values of any two variables associated with a test case and defining a scenario involving the values that is to be excluded from the test case; and (ii) a set of algorithms that resolve conflicts between pairs of variables based on the set of restrictions.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to one embodiment, a processor implements a method of generating a test case for regression testing of a feature of a hardware design. The processor of a hardware design verification system receives a set of restrictions such that each restriction of the set of restrictions represents a dependency between values of any two variables of various variables representing inputs of the test case and defines a scenario involving the values that is to be excluded from the test case. The processor also receives pre-assigned values for one or more variables. For each variable other than the one or more variables (for which values are pre-assigned), the processor assigns a first random value to the variable that is within a valid range for the variable. The processor then identifies a conflict between a first pair of variables of the by evaluating a first value of a first variable of the first pair of variables and a second value of a second variable of the first pair of variables based on the set of restrictions, and resolves the conflict by assigning a second random value to the first variable or the second variable within their respective valid ranges.

Figure 1B:
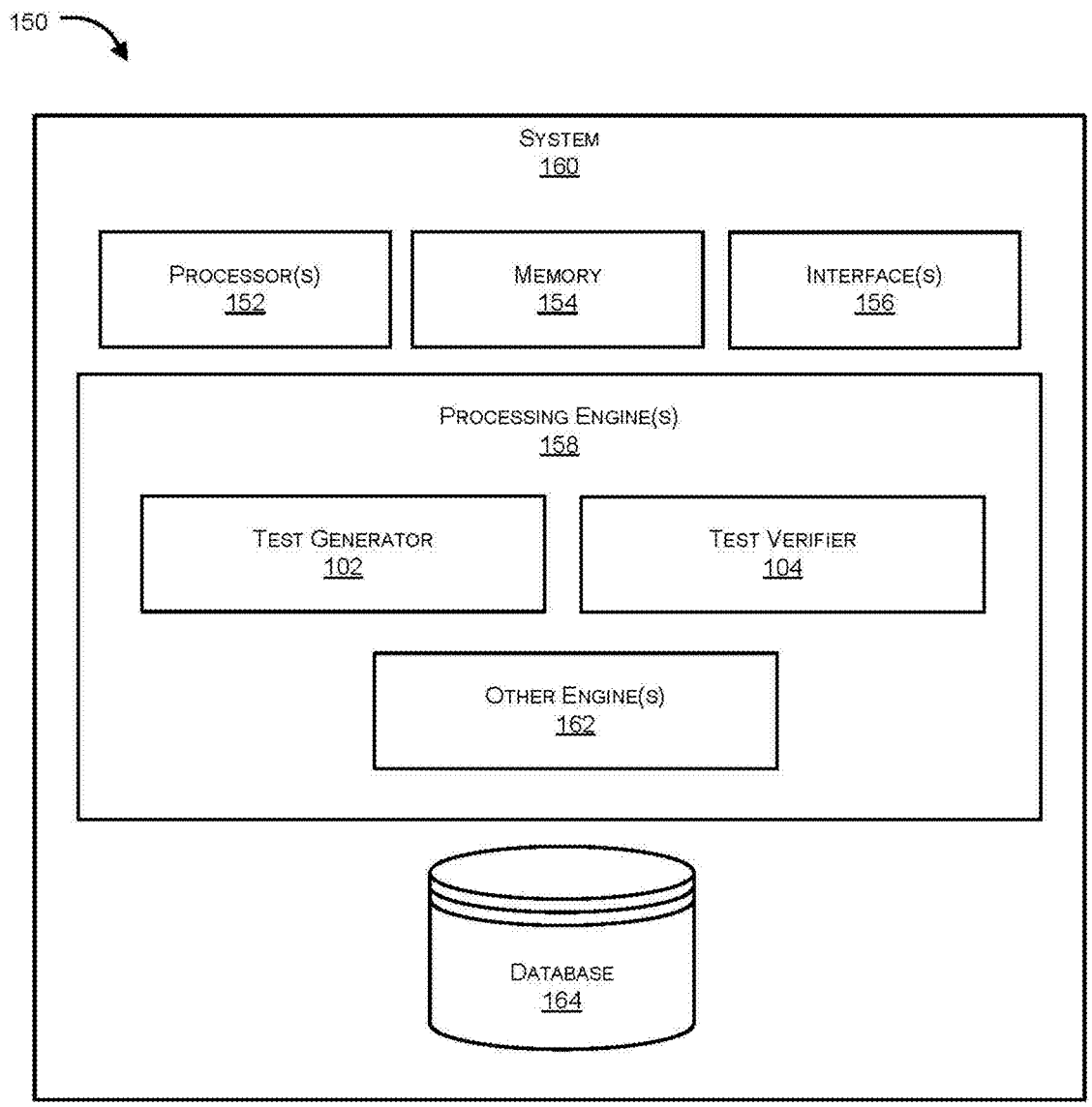
FIG. 1B is a block diagram illustrating functional components of a computing device in accordance with an embodiment of the present invention.

FIG. 1A illustrates a simplified architecture 100 of a design verification process in which in aspects of the present invention can be implemented in accordance with an embodiment of the present invention. Design verification is a critical stage of product design. In context of architecture 100, design under test 106 can be a product undergoing a testing process. A test generator 102 and a test verifier 104 are two parts of a hardware design verification system implemented in a computing device represented in block diagram 150 of FIG. 1B. In view of FIGS. 1A and 1B, block diagram 150 represents functional components of a hardware design verification system 160 (which is referred to as system 160 hereinafter) including test generator 102 and test verifier 104. Test generator 102 generates inputs for a test case for design under test 106, where the inputs include configuration parameters, register settings, memory allocation, and traffic injection, etc. These inputs can be represented or controlled by a set of variables. Accordingly, the inputs are received by design under test 106 to generate corresponding output. The output of design under test 106 can be then sent to test verifier 104, which also receives the expected output information from test generator 102. Optionally, test verifier 104 may send certain information back to test generator 102. Test verifier 104 can then compare output from design under test 106 with expected output, and report a match or a mismatch. If a mismatch is found, the administrator can debug the test.

Those skilled in the art would appreciate that if variable restrictions and dependencies are not well implemented, the design under test 106 can reach certain complexity as among failed test cases that need debugging, many can be invalid test cases that should not have been be generated in the first place. As described further below, embodiments of the present disclosure focus on solving variable dependency issues, so that the randomization process in test generator 102 only creates valid test cases with features of the hardware design.

Those skilled in the art would further appreciate that due to features of a design, randomization of a variable can have restrictions, which can be dependent upon other variables. The restrictions can make a set of variable values derived from a naive randomization infeasible, as the naive approach can generate many test cases that the design does not support and the verification for these test cases can become an unnecessary burden on the computing resource. Therefore, test generator 102 of system 160 analyzes several types of randomization and resolves any conflict in values of variables because of restrictions among different variables.

In the context of the present example, system 160 can include one or more processing resources (e.g., processor(s) 152). Processor(s) 152 can be implemented as one or more microprocessors, microcomputers, microcontrollers, digital signal processors, central processing units, logic circuitries, and/or any devices that manipulate data based on operational instructions. Among other capabilities, processor(s) 152 are configured to fetch and execute computer-readable instructions stored in a memory 154 of the system 160. Memory 154 can store one or more computer-readable instructions or routines, which may be fetched and executed to create or share the data units over a network service. Memory 154 can include any non-transitory storage device including, for example, volatile memory such as RAM, or non-volatile memory such as EPROM, flash memory, and the like. In an example embodiment, memory 154 may be a local memory or may be located remotely, such as a server, a file server, a data server, and the Cloud.

System 160 can also include one or more Interface(s) 156. Interface(s) 156 may include a variety of interfaces, for example, interfaces for data input and output devices, referred to as I/O devices, storage devices, and the like. Interface(s) 156 may facilitate communication of system 160 with various devices coupled to system 160. Interface(s) 156 may also provide a communication pathway for one or more components of system 160. Examples of such components include, but are not limited to, processing engine(s) 158 and database 164.

Processing engine(s) 158 can be implemented as a combination of hardware and software or firmware programming (for example, programmable instructions) to implement one or more functionalities of engine(s) 158. In the examples described herein, such combinations of hardware and software or firmware programming may be implemented in several different ways. For example, the programming for the engine(s) 158 may be processor executable instructions stored on a non-transitory machine-readable storage medium and the hardware for engine(s) 158 may include a processing resource (for example, one or more processors), to execute such instructions. In the examples, the machine-readable storage medium may store instructions that, when executed by the processing resource, implement engine(s) 158. In such examples, system 160 can include the machine-readable storage medium storing the instructions and the processing resource to execute the instructions, or the machine-readable storage medium may be separate but accessible to system 160 and the processing resource. In other examples, processing engine(s) 158 may be implemented by electronic circuitry. Database 164 can include data that is either stored or generated as a result of functionalities implemented by any of the components of processing engine(s) 158.

In an example, processing engine(s) 158 can include test generator 102, test verifier 104, and other engine(s) 162. Other engine(s) 162 can implement functionalities that supplement applications or functions performed by system 160 or processing engine(s) 158.

According to an embodiment, test generator 102 generates a test case for regression testing of a feature of a hardware design. To generate the test case, test generator 102 receives a set of restrictions and defines a scenario involving values that is to be excluded from the test case. Each restriction of the set of restrictions represents a dependency between the values of any two variables of various variables that represent inputs of the test case.

Test generator 102 receives pre-assigned values for one or more variables of the various variables. For example, for a test case a value to a variable can be pre-assigned, such as U=u, where U is a variable and u is value of the variable U. If a variable has a pre-assigned value, the variable should use the pre-assigned value and test generator 102 would not generate a new random value. However, for each variable of the various variables other than the one or more variables for which values are pre-assigned, test generator 102 assigns a first random value to the variable that is within a valid range for the variable. For example, if the test generator 102 does not receive pre-assigned value of a variable, test generator 102 assigns a random value in valid range of the variable.

Further, test generator 102 identifies a conflict between a first pair of variables including a first variable and a second variable. The conflict represents a particular scenario that is infeasible in the hardware design or a scenario for which the hardware design is not intended. The conflict can be identified by evaluating a first value of the first variable and a second value of the second variable based on the set of restrictions. Once the conflict is identified, test generator 102 resolves the conflict by assigning a second random value to the first variable or the second variable within their respective valid ranges.

According to one embodiment, the conflict can be between the first value of the first variable and the second value of the second variable when the first value is one of the received pre-assigned values and the second value was assigned by test generator 102. When test generator 102 identifies this conflict, test generator 102 resolves the conflict by assigning the second random value to the second variable. For example, after taking the set of restrictions into consideration, if pre-assigned U=u has a conflict with value of another variable V=v, where V does not possess a pre-assigned value and test generator assigns random value v within a valid range of variable V, then test generator 102 re-assigns another random value that is not equal to v, within valid range of variable V, to variable V.

Similarly, the conflict can be between the first value of the first variable and the second value of the second variable when the second value is one of the received pre-assigned values and the first value was assigned by test generator 102. When test generator identifies this conflict, test generator 102 resolves the conflict by assigning the second random value to the first variable. An example of conflict between a pair of variables can be:

U==0 and V==1 (when U=0 cannot coexist with V=1)

According to an embodiment, test generator 102 can resolve the conflict using to two exemplary functions including a major function algo_1(U, u, V, v) and an assistant function solve_conflict(U, u, V, v), which are described with reference to FIG. 2A below.

FIG. 2A is a pseudo code fragment illustrating a technique for resolving a conflict between a pair of a first variable and a second variable in accordance with an embodiment of the present invention. In context of the present example, exemplary function solve_conflict( ) can be used to detect a conflict and report an error. It would be pertinent to note that in function algo_1, U's pre-assignment condition can be checked by function is_assigned(U), which can return a true if U already possesses a value or false otherwise. In one implementation, is_assigned( ) can be a python dictionary (say, d) element existence check function such as d.has_key (U), or can be a single bit flag check in C. Function rand(V, v) can be used to get a random value within V's valid range, but excluding conflict value v. In one implementation, rand(V, v) can be easily created based on off-the-shelf libraries.

Those skilled in the art would appreciate that there can be a higher complexity when number of conflict pairs are more than one. An example of conflict between a number of pairs of variables can be:

U==0; V==1 (when U=0 cannot coexist with V=1)
U==1; V==2 (when U=1 cannot coexist with V=2)
U==1; W==1(when U=1 cannot coexist with W=1)
W==2; X==0 (when W=2 cannot coexist with X=0)

To resolve the conflict, pseudo code fragment 200 can be applied to each conflict pair one by one, which can lead to pseudo code fragment 210. FIG. 2B is a pseudo code fragment 210 illustrating a technique for resolving a conflict between more than one pair of a first variable and a second variable in accordance with an embodiment of the present invention. In context of the present example, S can denote a set of all variables and function pair (S, i) returns a potential conflict pair with their conflict values, i.e., {U, u, V, v}, when the conflict occurs if U=u and V=v. In the pseudo code fragment 210, i can be the index to potential conflict pairs.

According to an embodiment, test generator 102 can generate a graph representing a chain of restrictions based on the set of restrictions in which each node of the graph represents one of the variables and edges connecting any two of nodes represents a dependency between the corresponding variables so that test generator identifies a conflict by traversing the graph.

FIG. 2C is a pseudo code fragment 220 illustrating a technique for resolving a conflict for a graph of variables in accordance with an embodiment of the present invention. In context of the present example, multiple variables can form a chain of restrictions or a graph of restrictions. A chain can be considered as a special case of a graph. To handle all potential conflict pairs in the graph, a traversal algorithm (e.g. a well-known depth-first search or breadth-first search) can be used, and test generator 102 carefully not re-visits a visited node (e.g., by marking a flag corresponding to each visited node). After all potential conflict pairs are identified, pseudo code fragment 200 can be invoked. In the pseudo code fragment 220, G denotes graph of all variables, function pair(G, i) returns a potential conflict pair with its conflict values, i.e., {U, u, V, v}, when the conflict happens if U=u and V=v. Similar to pseudo code fragment 210, in pseudo code fragment 220, i is the index to potential conflict pairs. In context of the present example, function traverse_edge( ) performs a graph traversal to identify all conflict pairs, as an edge in G represents a conflict pair, and a node in G represents a variable.

According to an embodiment, test generator 102 can identify the conflict pairs by evaluating a first range of values of including the first value of the first variable and a second range of values including the second value of the second variable based on the set of restrictions. An example of value range restrictions between one pair of variables can be:

U (>0 and <=4.5) or (>10 and <=15.5); V<=100 or >=500

An example of value range restrictions between multiple pairs of variables can be:

U (>0 and <=4.5) or (>10 and <=15.5); V<=100 or >=500
U>4.5 and <=10; W==10 or >=20
W>=30; X>=20 and <=25

Figures 2D, 2E:
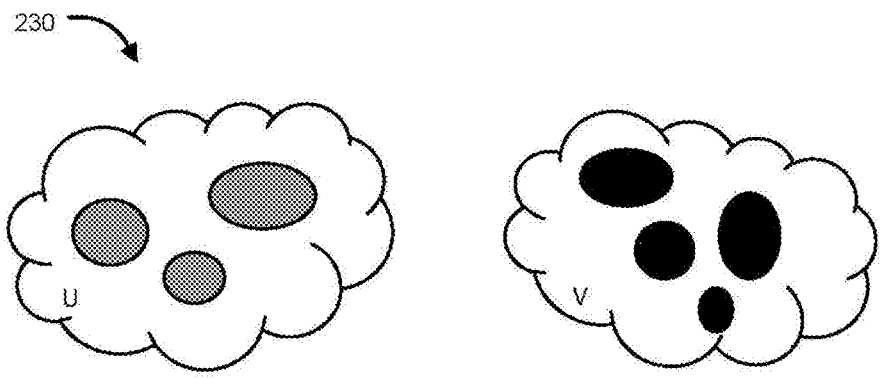
FIG. 2D is a conceptual illustration of conflicting ranges of values of a first variable and a second variable in accordance with an embodiment of the present invention.
FIG. 2E is a pseudo code fragment illustrating a technique for resolving a conflict between range of values of a first variable and a second variable in accordance with an embodiment of the present invention.

FIG. 2D is a conceptual illustration 230 of conflicting ranges of values of a first variable and a second variable and FIG. 2E is a pseudo code fragment 240 illustrating a technique for resolving a conflict between range of values of the first variable and the second variable in accordance with an embodiment of the present invention. In context of FIGS. 2D and 2E, if a conflict occurs when U is in range(U, i) and V in range(V, i), function solve_conflict(U, u, V, v) of FIG. 2A can be updated to its extended function solve_conflict_ext. Assuming range(U, i) is equivalent to a set of sub-ranges, which are all within the entire valid range of U. Illustration 230 represents clouds to indicate entire valid ranges of U and V, respectively. Within each cloud, for a certain i, there can be some areas, representing range(U, i) or range(V, i), respectively. The conflict happens when U falls into the areas of cloud of U while V falls into areas of cloud of V at the same time. Function solve_conflict_ext and its assistant function is_in can be used to resolve the conflict. In solve_conflict_ext, function rand can also be updated to rand_ext, which takes a range as second argument. In an implementation, solve_conflict of pseudo code fragment 200 can be replaced by solve_conflict_ext in order to resolve the conflicts.

Figure 3:
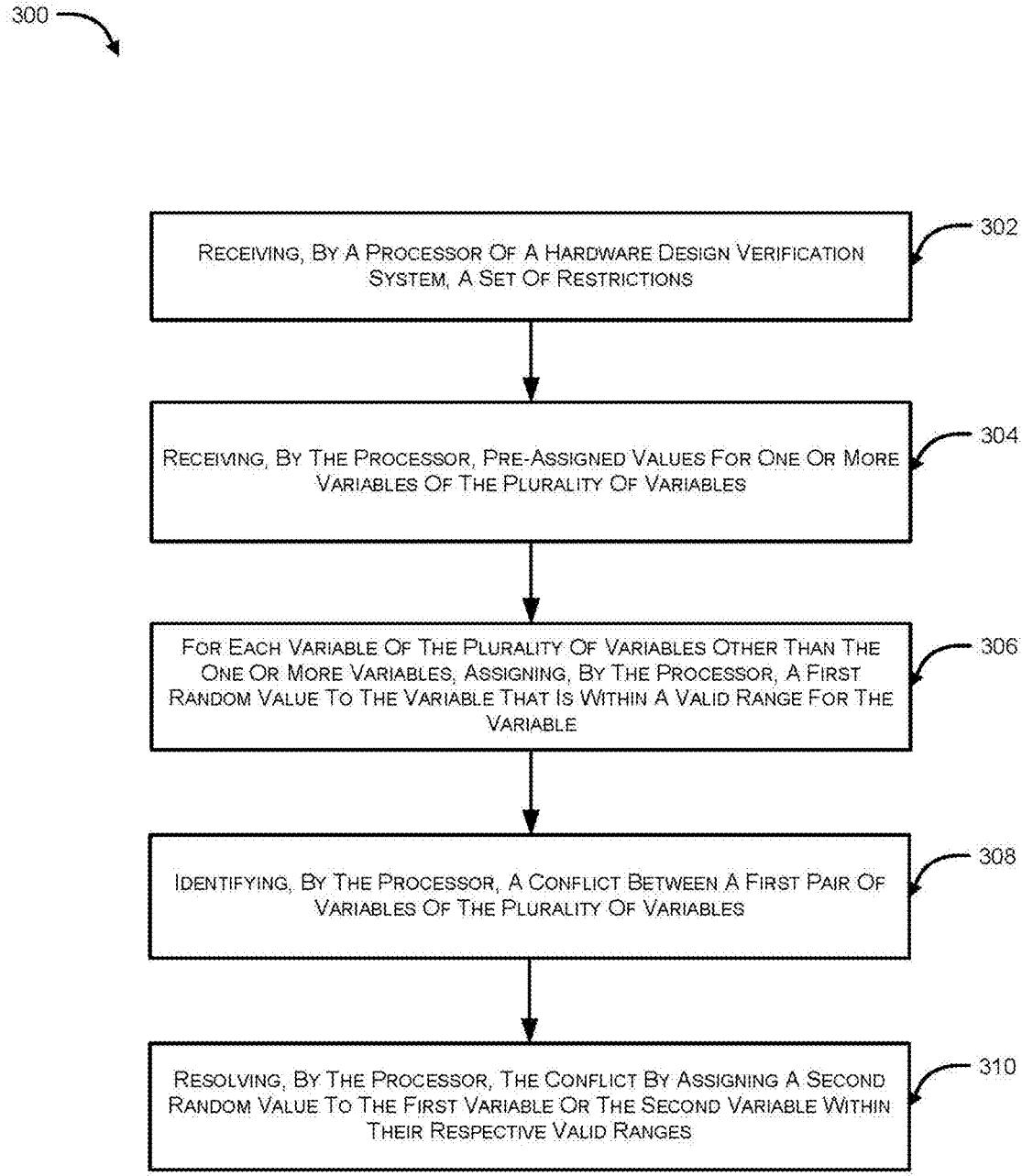
FIG. 3 is a flow diagram illustrating a conflict resolution process in accordance with an embodiment of the present invention.

FIG. 3 is a flow diagram illustrating a conflict resolution process in accordance with an embodiment of the present invention. The processing described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 400 described with reference to FIG. 4 below.

In context of the present example, at block 302, a processor of a hardware design verification system receives a set of restrictions such that each restriction of the set of restrictions represents a dependency between values of any two variables of a plurality of variables representing inputs of the test case and defines a scenario involving the values that is to be excluded from the test case. At block 304, the processor receives pre-assigned values for one or more variables of the plurality of variables. For each variable of the plurality of variables other than the one or more variables, at block 306, the processor assigns a first random value to the variable that is within a valid range for the variable. At block 308, the processor identifies a conflict between a first pair of variables of the plurality of variables by evaluating a first value of a first variable of the first pair of variables and a second value of a second variable of the first pair of variables based on the set of restrictions. Subsequently, at block 310, the processor resolves the conflict by assigning a second random value to the first variable or the second variable within their respective valid ranges.

Figure 4:
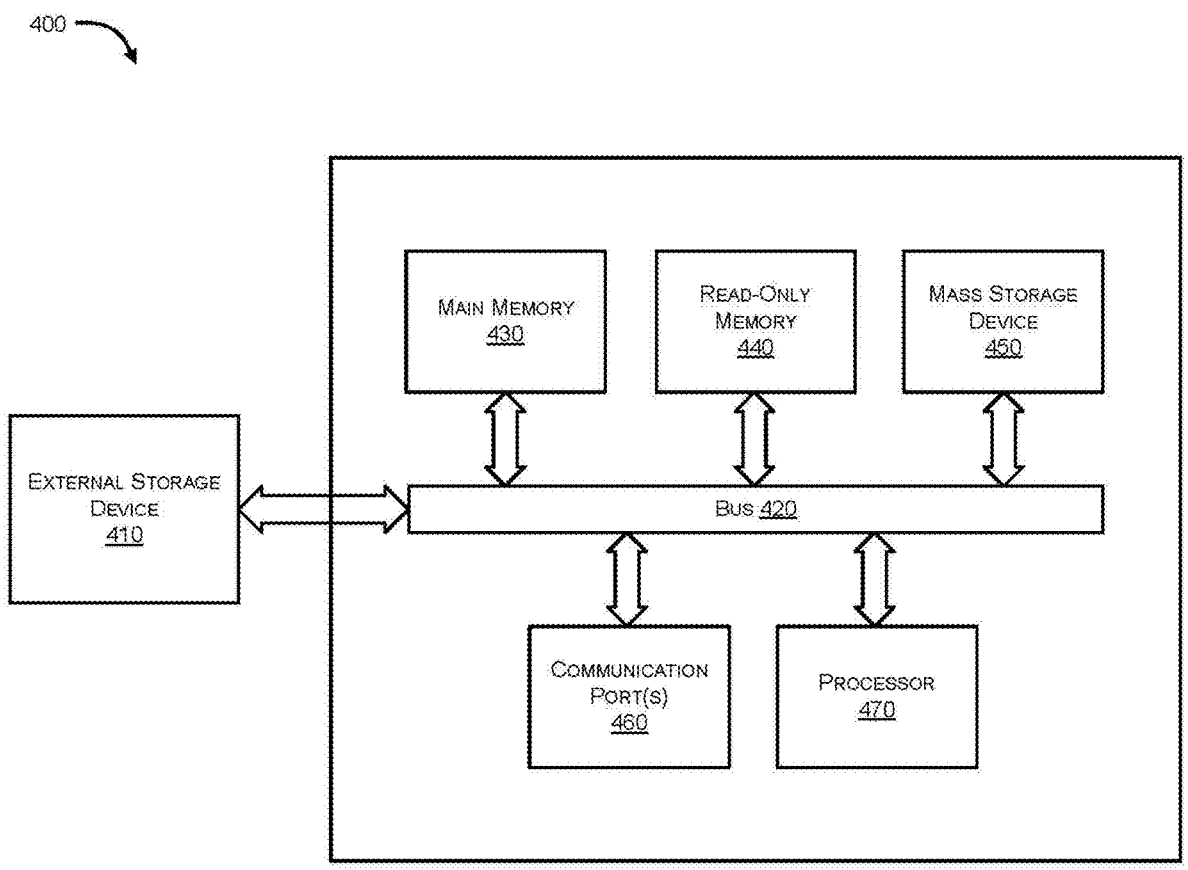
FIG. 4 illustrates an exemplary computer system in which or with which embodiments of the present invention may be utilized.

FIG. 4 illustrates an exemplary computer system 400 in which or with which embodiments of the present invention can be utilized. As shown in FIG. 4, computer system includes an external storage device 410, a bus 420, a main memory 430, a read only memory 440, a mass storage device 450, a communication port 460, and a processor 470. In one embodiment, computer system 400 may represent some portion of a system 160.

Those skilled in the art will appreciate that computer system 400 may include more than one processor 470 and communication ports 460. Examples of processor 470 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 470 may include various modules associated with embodiments of the present invention.

Communication port 460 can be any of an RS-232 port for use with a modem based dialup connection, a 10/100 Ethernet port, a Gigabit or 10 Gigabit port using copper or fiber, a serial port, a parallel port, or other existing or future ports. Communication port 460 may be chosen depending on a network, such a Local Area Network (LAN), Wide Area Network (WAN), or any network to which computer system connects.

Memory 430 can be Random Access Memory (RAM), or any other dynamic storage device commonly known in the art. Read only memory 440 can be any static storage device(s) e.g., but not limited to, a Programmable Read Only Memory (PROM) chips for storing static information e.g. start-up or BIOS instructions for processor 470.

Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage and communication blocks. Bus 420 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g. a display, keyboard, and a cursor control device, may also be coupled to bus 420 to support direct operator interaction with computer system. Other operator and administrative interfaces can be provided through network connections connected through communication port 460. External storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method of generating a test case for regression testing of a feature of a hardware design, the method comprising:
   receiving, by a processor of a hardware design verification system, a set of restrictions, wherein each restriction of the set of restrictions represents a dependency between values of any two variables of a plurality of variables representing inputs of the test case and defines a scenario involving the values that is to be excluded from the test case;
   receiving, by the processor, pre-assigned values for one or more variables of the plurality of variables;
   for each variable of the plurality of variables other than the one or more variables, assigning, by the processor, a first random value to the variable that is within a valid range for the variable;
   identifying, by the processor, a conflict between a first pair of variables of the plurality of variables by evaluating a first value of a first variable of the first pair of variables and a second value of a second variable of the first pair of variables based on the set of restrictions; and
   resolving, by the processor, the conflict by assigning a second random value to the first variable or the second variable within their respective valid ranges.

2. The method of claim 1, wherein the conflict represents a particular scenario for which the hardware design is not intended.

3. The method of claim 1, wherein the conflict represents a particular scenario that is infeasible in the hardware design.

4. The method of claim 1, wherein the conflict is between the first value of the first variable and the second value of the second variable and the first value is one of the received pre-assigned values and the second value was assigned during said assigning.

5. The method of claim 4, wherein in response to identifying the conflict, said resolving, by the processor, the conflict comprises assigning the second random value to the second variable.

6. The method of claim 1, wherein the conflict is between the first value of the first variable and the second value of the second variable and the second value is one of the received pre-assigned values and the first value was assigned during said assigning.

7. The method of claim 6, wherein in response to identifying the conflict, said resolving, by the processor, the conflict comprises assigning the second random value to the first variable.

8. The method of claim 1, further comprising generating a graph representing a chain of restrictions based on the set of restrictions in which each node of a plurality of nodes of the graph represents one of the plurality of variables and each edge connecting any two of the plurality of nodes represents a dependency between the corresponding variables.

9. The method of claim 8, wherein said identifying, by the processor, a conflict is performed by traversing the graph.

10. The method of claim 9, wherein said evaluating the first value of the first variable of the first pair of variables and the second value of the second variable of the first pair of variables includes evaluating a first range of values including the first value and a second range of values including the second value based on the set of restrictions.

11. A non-transitory computer-readable storage medium embodying a set of instructions for generating a test case for regression testing of a feature of a hardware design, which when executed by a processor of a hardware design verification system, causes the processor to perform a method comprising:
    receiving, by the processor, a set of restrictions, wherein each restriction of the set of restrictions represents a dependency between values of any two variables of a plurality of variables representing inputs of the test case and defines a scenario involving the values that is to be excluded from the test case;
    receiving, by the processor, pre-assigned values for one or more variables of the plurality of variables;
    for each variable of the plurality of variables other than the one or more variables, assigning, by the processor, a first random value to the variable that is within a valid range for the variable;
    identifying, by the processor, a conflict between a first pair of variables of the plurality of variables by evaluating a first value of a first variable of the first pair of variables and a second value of a second variable of the first pair of variables based on the set of restrictions; and
    resolving, by the processor, the conflict by assigning a second random value to the first variable or the second variable within their respective valid ranges.

12. The non-transitory computer-readable storage medium of claim 11, wherein the conflict represents a particular scenario for which the hardware design is not intended.

13. The non-transitory computer-readable storage medium of claim 11, wherein the conflict represents a particular scenario that is infeasible in the hardware design.

14. The non-transitory computer-readable storage medium of claim 11, wherein the conflict is between the first value of the first variable and the second value of the second variable and the first value is one of the received pre-assigned values and the second value was assigned during said assigning.

15. The non-transitory computer-readable storage medium of claim 14, wherein in response to identifying the conflict, said resolving, by the processor, the conflict comprises assigning the second random value to the second variable.

16. The non-transitory computer-readable storage medium of claim 11, wherein the conflict is between the first value of the first variable and the second value of the second variable and the second value is one of the received pre-assigned values and the first value was assigned during said assigning.

17. The non-transitory computer-readable storage medium of claim 16, wherein in response to identifying the conflict, said resolving, by the processor, the conflict comprises assigning the second random value to the first variable.

18. The non-transitory computer-readable storage medium of claim 11, further comprising generating a graph representing a chain of restrictions based on the set of restrictions in which each node of a plurality of nodes of the graph represents one of the plurality of variables and edges connecting any two of the plurality of nodes represents a dependency between the corresponding variables.

19. The non-transitory computer-readable storage medium of claim 18, wherein said identifying, by the processor, a conflict is performed by traversing the graph.

20. The non-transitory computer-readable storage medium of claim 19, wherein said evaluating the first value of the first variable of the first pair of variables and the second value of the second variable of the first pair of variables includes evaluating a first range of values including the first value and a second range of values including the second value based on the set of restrictions.

* * * * *